United States Patent
Baughman et al.

(10) Patent No.: US 10,834,464 B2
(45) Date of Patent: *Nov. 10, 2020

(54) EXPERIENCE-DIRECTED DYNAMIC STEGANOGRAPHIC CONTENT SWITCHING

(71) Applicant: International Business Machines Corporation, Armonk, NY (US)

(72) Inventors: Aaron K. Baughman, Silver Spring, MD (US); John S. Cope, Richmond, VA (US); Nicholas A. McCrory, Sacramento, CA (US); Diwesh Pandey, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/540,519

(22) Filed: Aug. 14, 2019

(65) Prior Publication Data

US 2019/0373325 A1 Dec. 5, 2019

Related U.S. Application Data

(63) Continuation of application No. 15/336,950, filed on Oct. 28, 2016, now Pat. No. 10,440,434.

(51) Int. Cl.
*H04N 21/466* (2011.01)
*H04N 21/25* (2011.01)
(Continued)

(52) U.S. Cl.
CPC ... *H04N 21/4668* (2013.01); *H04N 21/23424* (2013.01); *H04N 21/251* (2013.01);
(Continued)

(58) Field of Classification Search
CPC ......... H04N 21/4668; H04N 21/23424; H04N 21/251; H04N 21/25891; H04N 21/26258;
(Continued)

(56) References Cited

U.S. PATENT DOCUMENTS

| | | | |
|---|---|---|---|
| 7,757,171 B1 * | 7/2010 | Wong | G11B 27/105 715/719 |
| 8,373,768 B2 * | 2/2013 | Bill | G06F 16/639 348/222.1 |

(Continued)

OTHER PUBLICATIONS

List of all IBM related dockets. Appendix P. 2019.

*Primary Examiner* — James R Sheleheda
(74) *Attorney, Agent, or Firm* — Garg Law Firm, PLLC; Rakesh Garg; James Nock

(57) ABSTRACT

An experience feedback of a user is measured, the experience feedback being in response to a presentation of a stream of a content. In response to the determining that an experience value corresponding to the experience feedback has to be adjusted to a target experience value, an optional content selected, the optional content including data indicative of an option experience value, the option experience value being at least a component of a difference between the experience value and the target experience value. The optional content is steganographically combined with the content in the stream to form a combined stream. During the presentation of the combined stream, a switch is made to the optional content such that a portion of the content is replaced by the optional content in the presentation, the switching causing in the user a change from the experience value towards the target experience value.

20 Claims, 7 Drawing Sheets

(51) Int. Cl.
 *H04N 21/258* (2011.01)
 *H04N 21/45* (2011.01)
 *H04N 21/442* (2011.01)
 *H04N 21/234* (2011.01)
 *H04N 21/262* (2011.01)
 *H04L 29/08* (2006.01)

(52) U.S. Cl.
 CPC . *H04N 21/25891* (2013.01); *H04N 21/26258* (2013.01); *H04N 21/44204* (2013.01); *H04N 21/44218* (2013.01); *H04N 21/4532* (2013.01); *H04N 21/4667* (2013.01); *H04L 67/306* (2013.01)

(58) Field of Classification Search
 CPC ....... H04N 21/44204; H04N 21/44218; H04N 21/4532; H04N 21/4667; H04N 21/44213; H04N 21/266; H04N 21/2668; H04N 21/234; H04L 67/306
 See application file for complete search history.

(56) References Cited

U.S. PATENT DOCUMENTS

| | | | | |
|---|---|---|---|---|
| 8,855,798 | B2* | 10/2014 | DiMaria | G06F 16/44 700/94 |
| 8,898,091 | B2* | 11/2014 | Frank | G06F 3/013 706/12 |
| 9,367,196 | B1* | 6/2016 | Goldstein | G09B 5/062 |
| 9,652,676 | B1* | 5/2017 | Dey | H04N 21/4223 |
| 9,788,056 | B2* | 10/2017 | Vijay | H04N 21/4532 |
| 10,440,434 | B2* | 10/2019 | Baughman | H04N 21/26258 |
| 2003/0063222 | A1* | 4/2003 | Creed | H04N 7/163 348/687 |
| 2003/0093784 | A1* | 5/2003 | Dimitrova | H04N 7/18 725/10 |
| 2007/0074619 | A1* | 4/2007 | Vergo | G10H 1/42 84/612 |
| 2007/0099684 | A1* | 5/2007 | Butterworth | G11B 27/034 463/1 |
| 2008/0109391 | A1* | 5/2008 | Chan | G06N 5/00 706/45 |
| 2009/0234888 | A1* | 9/2009 | Holmes | G06F 16/683 |
| 2010/0011388 | A1* | 1/2010 | Bull | H04N 21/42201 725/9 |
| 2010/0321519 | A1* | 12/2010 | Bill | G06F 16/639 348/222.1 |
| 2012/0226706 | A1* | 9/2012 | Choi | G06F 16/68 707/752 |
| 2012/0290266 | A1* | 11/2012 | Jain | G16H 50/20 702/187 |
| 2013/0283162 | A1* | 10/2013 | Aronsson | H04N 21/42201 715/719 |
| 2014/0287387 | A1* | 9/2014 | Vukasinovic | G09B 7/02 434/236 |
| 2014/0330848 | A1* | 11/2014 | Chen | G06F 16/4387 707/749 |
| 2015/0020106 | A1* | 1/2015 | Belyaev | H04N 21/458 725/45 |
| 2015/0033262 | A1* | 1/2015 | Klappert | H04N 21/4334 725/43 |
| 2015/0350730 | A1* | 12/2015 | el Kaliouby | A61B 5/165 725/12 |
| 2015/0373385 | A1* | 12/2015 | Straub | H04N 21/23424 725/34 |
| 2015/0375117 | A1* | 12/2015 | Thompson | H04N 21/254 463/9 |
| 2016/0062995 | A1* | 3/2016 | Ng | G06F 16/438 707/723 |
| 2016/0196105 | A1* | 7/2016 | Vartakavi | G06F 3/165 700/94 |
| 2016/0381415 | A1* | 12/2016 | Vijay | G06F 3/016 725/12 |
| 2017/0053320 | A1* | 2/2017 | Russek | G06F 16/285 |
| 2017/0055033 | A1* | 2/2017 | Christie | G06F 16/436 |
| 2017/0180799 | A1* | 6/2017 | Dey | G06K 9/00892 |

* cited by examiner

EXPERIENCE-DIRECTED DYNAMIC STEGANOGRAPHIC CONTENT SWITCHING

TECHNICAL FIELD

The present invention relates generally to a method, system, and computer program product for presenting customized multimedia data in an interactive manner to a user. More particularly, the present invention relates to a method, system, and computer program product for experience-directed dynamic steganographic content switching.

BACKGROUND

Hereinafter, content such as video content, audio-visual content, content relating to a simulation or a simulated environment, content related to or usable in an augmented reality environment, and other similarly purposed content is collectively and interchangeably referred to as "content", or "multimedia", "multimedia data", or "multimedia content", unless expressly disambiguated where used.

Streaming of content is the process of progressive transmission of the content from a sender device to a receiver device such that a playback or other use of the streamed content can begin without a priori receiving the entirety of the content from the sender device and continuing to receive one or more remaining portions of the content as other previously received portions of the content are used in this manner. Streamed content is also interchangeably referred to herein as a "stream" or "stream data" unless expressly disambiguated where used.

Users engage with multimedia content in a variety of ways. Some content engages users visually, other content engages users audibly, some other content engages users in a tactile manner, or some combination of these and other currently possible manners.

Engaging with multimedia content results in an emotional involvement of the user with the content. This emotional involvement is an experience that the user has relative to the content with which the user is engaged in some manner.

The illustrative embodiments recognize that different users can have different experiences with the same content. For example, different viewers have different reactions, acceptance rates, likes or dislikes when viewing the same movie. Experiencing music, videos, games or gaming environments, and the like, is highly dependent on the personal traits of the user and is therefore highly variable from user to user.

The illustrative embodiments recognize that it is advantageous to maximize the experience that is preferred or desired by a user from a given content. Presently, content is either packaged in a one-size-fits-all manner where the same content is available to all users, or prepackaged different versions of the content are available for predetermined user groups having identifiable group preferences. For example, a movie might have a single storyline for all users regardless of their experience preferences, or some movies provide a limited number of different endings in an attempt to accommodate users with certain experience preferences.

As an example, if the only version of the movie has a tragic ending, users who like tragic story experiences would have a better experience at the movie as compared to those who prefer comic experiences. If a movie has a tragic ending option and a comic ending option, the users who prefer those two experiences will be able to select the version most suited to their preferences, but the users who prefer a happy story-ending may not have a preferred choice available and have to settle for a lesser option.

The illustrative embodiments further recognize that even when alternative storylines are available in multimedia content, those options are limited in experience variety, preconfigured with the content, and have to be expressly selected by the user according to their experience preference. Often, even if multiple experience options are available with some content, all such options are delivered with the content throughout the delivery of the content. The interactivity with the content is limited to selecting a preconfigured option. The illustrative embodiments recognize that this manner of delivering interactive content to users is inflexible, not dynamically personalized, and wasteful of data transmission and storage resources.

The illustrative embodiments further recognize that the type of experience a user is having can be measured directly from the user or from indirect observations of the user. For example, a user becoming stressed can be detected using a variety of biometric indicators, such as including but not limited to perspiration or skin conductivity, heartrate, tremors, agitated posture or movements, and so on. Indirect observations of a user, such as through a camera pointed at the user, can be processed using image analysis, to reveal facial expressions indicative of a type of experience the user is having. The biometric indicators, the image or sound captured from the user, and other similar indicators of a user's experience are referred to herein as feedback or experience feedback.

SUMMARY

The illustrative embodiments provide a method, system, and computer program product. An embodiment includes a method that measures an experience feedback of a user, the experience feedback being responsive to a presentation of a stream of a content. The embodiment determines that an experience value corresponding to the experience feedback has to be adjusted to a target experience value. The embodiment selects, responsive to the determining, an optional content, the optional content comprising data indicative of an option experience value, the option experience value being at least a component of a difference between the experience value and the target experience value. The embodiment combines, steganographically, the optional content with the content in the stream, forming a combined stream. The embodiment switches, during the presentation of the combined stream, to the optional content such that a portion of the content is replaced by the optional content in the presentation, the switching causing in the user a change from the experience value towards the target experience value.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
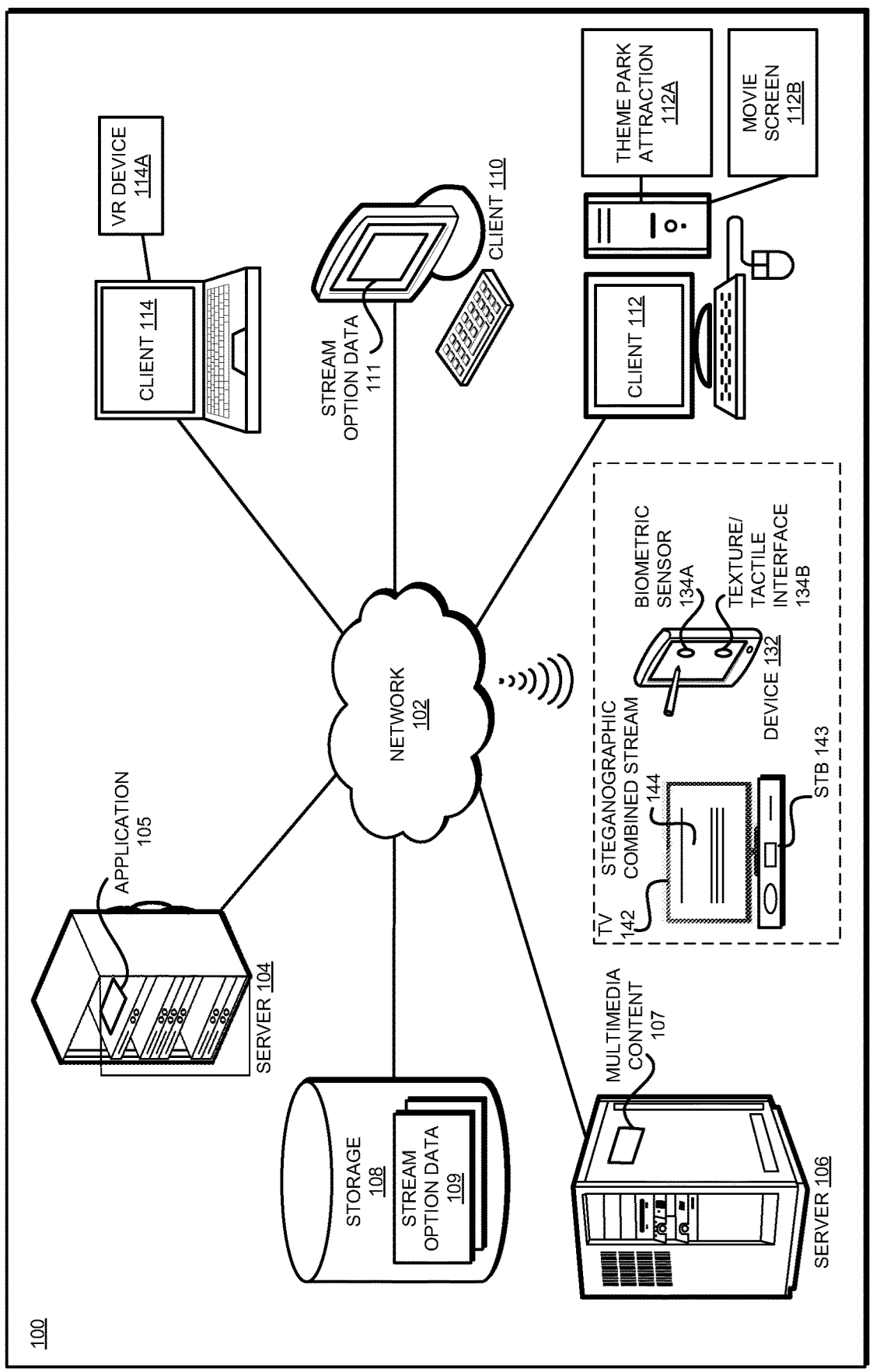
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to experience-directed dynamic steganographic content switching.

An embodiment can be implemented as a software application. The application implementing an embodiment can be configured as a modification of an existing content streaming system, as a separate application that operates in conjunction with an existing content streaming system, a stand-alone application, or some combination thereof.

Steganography is the process of hiding additional or different content within a given content. For example, according to the illustrative embodiments, one or more option streams can be steganographically combined with a stream of given multimedia content. An option stream is a stream of data of an option that is available for use by a user.

As an example, a user may prefer an uplifting storyline in a movie or a gaming environment. According to one embodiment, a portion of the content—which can exist anywhere in the content—can be replaced with an alternate content, to wit, an option, such that for that user, when the portion is played or used, the option is played or used instead of the original content of that portion. Any number of portions, anywhere in an original content, can be replaced with, or swapped out for, any number of corresponding options. For example, portion A of the original content may be swapped out for an option with a happy experience, portion B of the content may be replaced by an option designed to provide a frightful experience, and so on until portion N is replaced with an option designed to enhance a tragic experience.

As can be seen from this example, the content stream according to an embodiment can be highly customized to meet a specific user's desires for a specific experience. Furthermore, the customization, to wit, the swapping of content portion with an option, occurs dynamically in response to how the user's experience progresses while playing, using, or otherwise interacting with the content.

A user need not expressly do anything other than use a given content in order to provide an experience feedback. The illustrative embodiments recognize that an experience feedback of a user can be measured. For example, one or more indicators of experience feedback can be measured and compared with one or more suitable ranges or thresholds known to represent certain types and levels of experiences.

An embodiment receives experience feedback from a user who is presently experiencing the content of a given stream. The embodiment measures the experience feedback to determine a type and level of experience the user is having while using the content. The embodiment determines whether the experience has to be annealed towards a certain type, level, or both of the same or a different experience. Annealing an experience is the process of adjusting the experience such that the experience becomes robust or improves by increasing or decreasing in level or intensity within the same type of experience, changing to a different experience at the same level, changing to a different level in a different type of experience, changing from one type to another type of experience at a certain rate of change, changing from one level to another level of experience within a type of experience at a certain rate of change, or some combination thereof.

As one example, a below-threshold level of an amusement type experience may have to be enhanced to a higher than the threshold level of amusement. As another example, an above-threshold level of fright type experience may have to be reduced to a lower than the threshold level of fright. As another example, an above-threshold level of boredom type experience may have to be changed to an enjoyable type of experience at an equal or at least a threshold level. As another example, an above-threshold level of euphoria type experience may have to be changed at a gradual rate to a reduced level of euphoria before transitioning into a low level of disappointment type of experience.

An embodiment determines the type of experience, the level of experience, the rate of change of experience, or some combination of these and other experience adjustments, that may be needed for the user whose experience feedback was measured. The starting value of the experience adjustment is based on one or more of presently measured experience feedback parameters. The target value of the experience feedback corresponds to achieving one or more target values of the one or more experience feedback parameters.

As a non-limiting example, if a level of fright has to be reduced, the skin conductivity of the user should be reduced from a measured value to a target value. As another non-limiting example, if a level of boredom is to be reduced, the facial expression in an image analysis has to be changed from the measured value to a target value.

As can be seen from these examples, an embodiment can be configured to anneal the user's experience dynamically, for any given content, at any given time during the use of the content, in any manner, by steganographically combining any number or type of suitably constructed options with the content. These examples of types, levels, and rates of change of experiences are not intended to be limiting. From this disclosure, those of ordinary skill in the art will be able to conceive many other types, levels, and rate of change of experiences that can be measured and annealed in a similar manner, and the same are contemplated within the scope of the illustrative embodiments.

One embodiment tracks and saves a user's past experiences to determine the experience preferences of the user. For example, the past viewing history of the user may reveal that the user fast-forwards the frightening scenes which have a fright level exceeding a threshold. Accordingly, the embodiment can determine that the user is averse to fright type experience exceeding the threshold. Accordingly, when the content includes a portion where the fright experience level exceeds that threshold, the embodiment set a target of a lower fright value or some other level of some other experience type.

Another embodiment uses the user's network on a social media platform to determine an experience preference. Generally, a user's choices are influenced by the choices made by the user's friends or social network. Data about a friend expressing their experience preference may be available from a social media platform. The friend may expressly state a preference, or indirectly indicate a preference for a type and/or level of experience by discussing their likes and dislikes about a particular content. The user's expected experience preference can be derived from such data. For example, if the friend did (or did not) like a tragedy drama experience, there is a good chance that the user might (or might not) like that experience as well.

An option has a type of experience, a level of experience, or both associated with the option, such as in the form of option metadata. The type and/or level of experience associated with the option is an indication that the option provides that type and/or level of that experience.

An embodiment selects an option based on an adjustment that has to be applied to the user's measured experience. One or more data sources may provide the data of one or more options. More than one options may be selected by the embodiment to cause the adjustment. For example, a change from one type of experience to a different type of experience may be possible using a single option for one content but may need a sequence of several options for the transition as relates to another content. Similarly, a change from one level of experience to a different level of the experience may be possible using a single option for one content but may need a sequence of several options for the transition as relates to another content. As another example, a rate of change in the user's experience may be achievable using a single option for one content but may need a sequence of several options for the transition as relates to another content.

Thus, an embodiment selects one or more options to cause the computed adjustment in the user's experience with the content. An option also has an insertion point at which the option can be inserted into the content stream. When the option is replacing a portion, the insertion point is the beginning of the portion in the content. The insertion point of the option is also a part of the option metadata. An option may have one or more possible insertion points.

Depending on the insertion points of the selected options, and depending on when the user experience has to be adjusted during the use of the content, an embodiment steganographically combines the selected options with the content stream. The combined stream thus constructed is then streamed to a device associated with the user. When an insertion point of a steganographically combined option is reached during the use of the content from the combined stream, the embodiment causes the option to be presented to the user instead of a portion of the content from the content stream.

As the options are switched in and out of the playback or use of the combined stream, an embodiment continues to measure the user's experience feedback to determine whether the desired trend in the experience feedback is being achieved by the switching. One embodiment changes the composition of the combined stream, e.g., by selecting and combining a different option for a portion if the desired trend is not observed in the user's experience feedback.

When an embodiment measures a trend in the user's experience feedback to be within a tolerance value of a desired trend value, the embodiment saves the identifiers of the options that were used, the insertion points at which those options were used, a length of time for which those options were used, and a sequence in which those were used to create a custom experience for the user. The saved information forms a content pathway. Each content pathway corresponds to a customized user experience in the manner described herein. Each content pathway can be visualized as a path through a collection of content and options to create the customized experience.

An embodiment uses a saved content pathway to recreate the customized experience for the user at a later time. For example, the content and the options participating in the content pathway can be reassembled in the same manner—using the same insertion points, lengths of times, and sequence—so that the user can have the same experience as the user did with the combined stream earlier. A saved content pathway can also be shared with another user—such as with a friend in the user's social network—so that the other user can also have the customized experience that the user had when the custom pathway was created.

The manner of experience-directed dynamic steganographic content switching described herein is unavailable in the presently available methods. A method of an embodiment described herein, when implemented to execute on a device or data processing system, comprises substantial advancement of the functionality of that device or data processing system in constructing and presenting steganographically combined multimedia content streams to observe a user's real-time experience feedback and dynamically create a customized experience for the user from the content.

The illustrative embodiments are described with respect to certain types of content, streams, experience types and levels, experience feedback indicators, measurements, adjustments, thresholds, values, ranges, sequences, options, insertion points, portions, periods, pathways, profiles, preferences, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
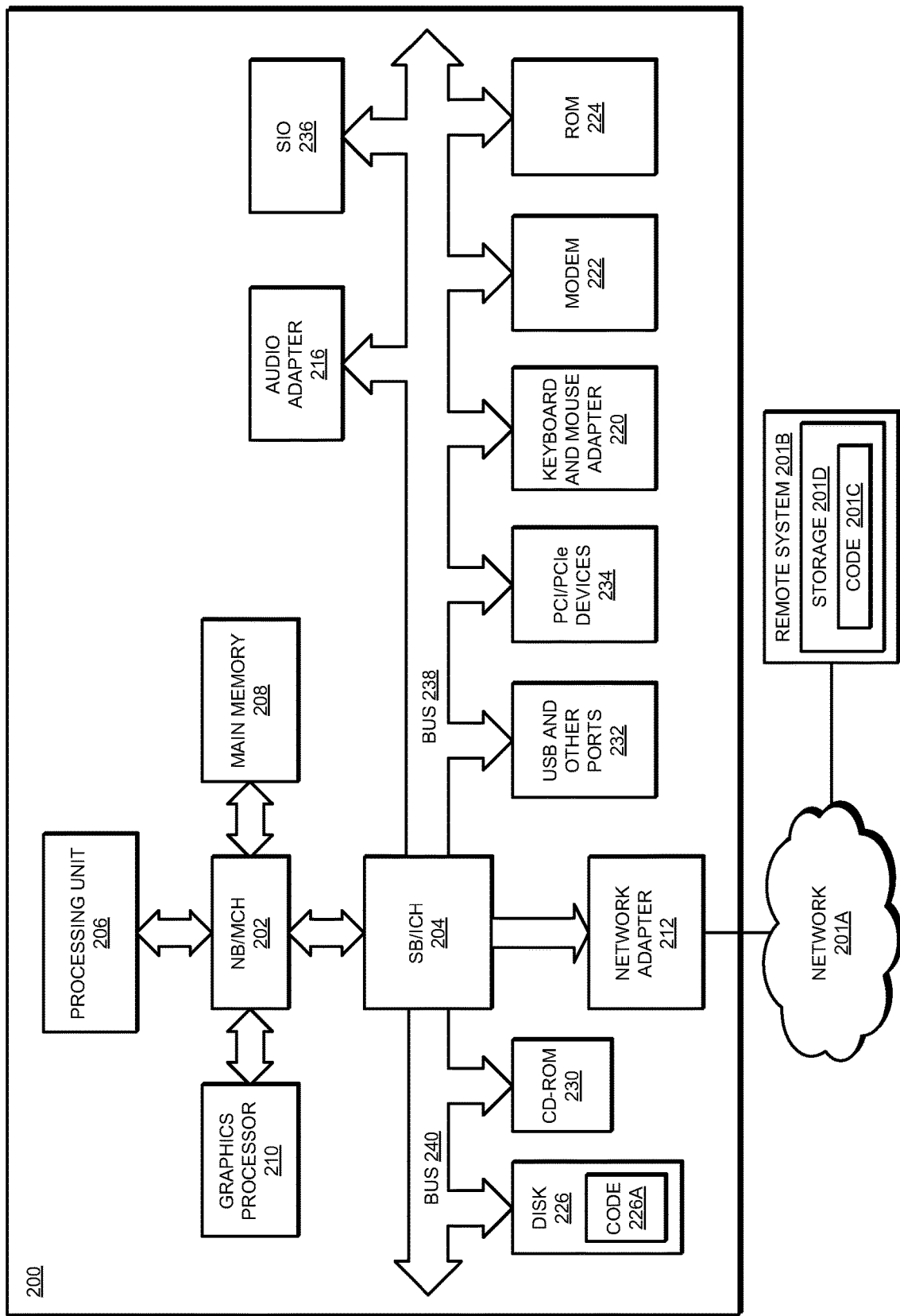
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Multimedia content 107 is an example of content presently streamed by a sender device, e.g., server 106, to a receiver device, e.g., to device 132, or the combination of television 142 and set-top box (STB) 143. Option data 109 is an example of stored data that can be used as an option for combining with the stream of content 107 in a manner described herein. Another data source, such as client 110, may provide an option, e.g., option data 111, as well. Any number of data sources or repositories may provide data for one or more options in this manner. Application 105 combines content 107 and one or more option 111 to steganographically construct combined stream 144, which can be presented in the client environment depicted using dashed lines in FIG. 1, e.g., on the combination of television set 142 and STB 143, on device 132, or both, depicted inside the client environment. Device 132 is associated with the user and can directly measure one or more biometric indicators of the user's experience feedback in response to using combined stream 144, in a manner described herein. For example, device 132 itself may include one or more sensors—e.g., biometric sensor 134A and tactile or texture interface 134B—as shown. Alternatively or additionally (not shown), a wearable device, such as a smartwatch, a smart eyewear, an athletic activity tracker, or other wearables, may operate alone or in conjunction with device 132 and include one or more sensors to capture one or more indicators of experience feedback as described herein. Additional device (not sown), such as a camera or a microphone, may be directed towards a user of device 132, to capture visible or audible expressions as indicators of experience feedback. Application 105 presents a steganographically combined stream 144 using a suitable interface on television 142 or device 132, such as an interface configured for video presentation, audio presentation, augmented reality presentation, gaming presentation, and other types of multimedia content presentations as contemplated herein. Application 105 can also present a steganographically combined stream in a similar manner using a suitable interface on client 112, e.g., on theme park attraction 112A or movie screen 112B driven by client 112, or virtual reality device 114A driven by client 114, and many other configurations.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
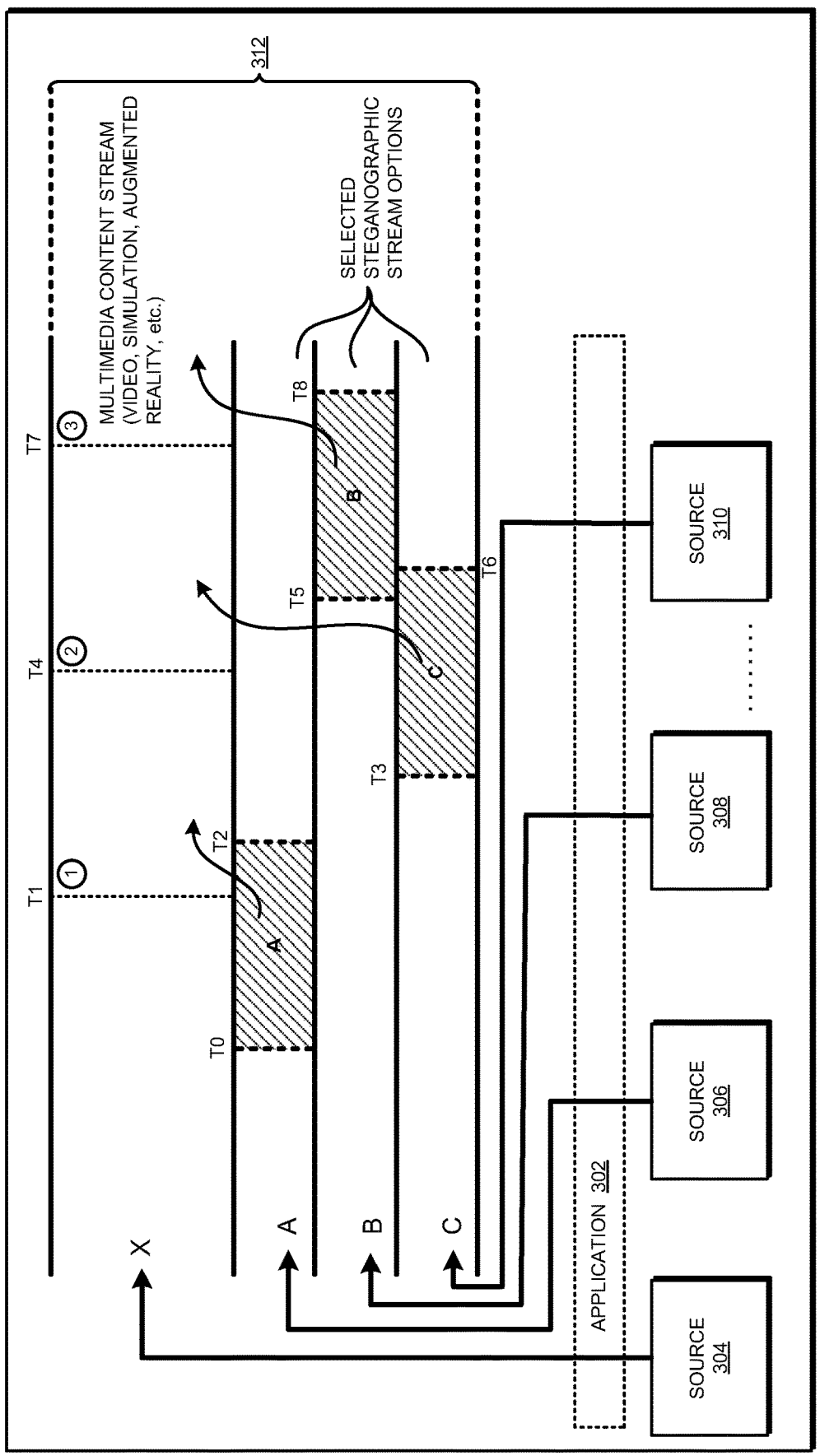
FIG. 3 depicts a block diagram of an example steganographically combined stream constructed in accordance with an illustrative embodiment.

With reference to FIG. 3, this figure depicts a block diagram of an example steganographically combined stream constructed in accordance with an illustrative embodiment. Application 302 is an example of application 105 in FIG. 1. Data source 304 is an example of data source 106 in FIG. 1, and provides content X for streaming in the manner of content 107 in FIG. 1.

Data sources 306, 308, and 310 are any number of data sources in the manner of repository 108 and/or client 110 in FIG. 1. Each of data source 306-310 provides the data of one or more options as described herein. Only as a non-limiting example to illustrate an operation of an embodiment, three example options A, B, and C are depicted as combined in steganographically combined stream 312 (interchangeably also referred to herein as "combined stream" for compactness). For example, source 306 provides the data of option A, source 308 provides the data of option B, and source 310 provides the data of option C.

Suppose, as a non-limiting example, portions 1, 2, and 3 are to be altered for annealing a user experience in a manner described herein. Application 302 determines that option A should be used to replace portion 1 of content X, option C should be used to replace portion 2 of content X, and option B should be used to replace portion 3 of content X, as shown.

Accordingly, application 302 combines, at time T0, a selected portion of option A that would fit or occupy portion 1, which begins at time T1. The streaming of such a portion of option A begins at time T0 and ends at time T2. This stream of option A data is combined with the stream of content X. Time T0 at which the combining of option A begins is sufficiently in advance of starting time T1 of portion 1 such that the user would not experience a disruption in the presentation. Furthermore, data of option A is steganographically combined with the data of content X such that while content X is being presented to the user, e.g., prior to time T1, the data of option A, e.g., from time T0 to time T1, remains hidden from the user.

In a similar manner, application 302 determines that option C should be used to replace portion 2 of content X. Accordingly, application 302 combines, at time T3, a selected portion of option C that would fit or occupy portion 2, which begins at time T4. The streaming of such a portion of option C begins at time T3 and ends at time T6. This stream of option C data is steganographically combined with the stream of content X as described herein.

In a similar manner, application 302 determines that option B should be used to replace portion 3 of content X. Accordingly, application 302 combines, at time T5, a selected portion of option B that would fit or occupy portion 3, which begins at time T7 and ends at time T9. The streaming of such a portion of option B begins at time T5 and ends at time T8. This stream of option B data is steganographically combined with the stream of content X as described herein.

Thus, the user's custom experience is created by presenting to the user content X until time T1, option A as portion 1 from time T1 until time T4, option C as portion 2 from time T4 until time T7, option B as portion 3 from time T7 until time T9, and content X or other combinations of options thereafter. A content pathway constructed in the manner described herein would indicate this information in a suitable form.

Figure 4:
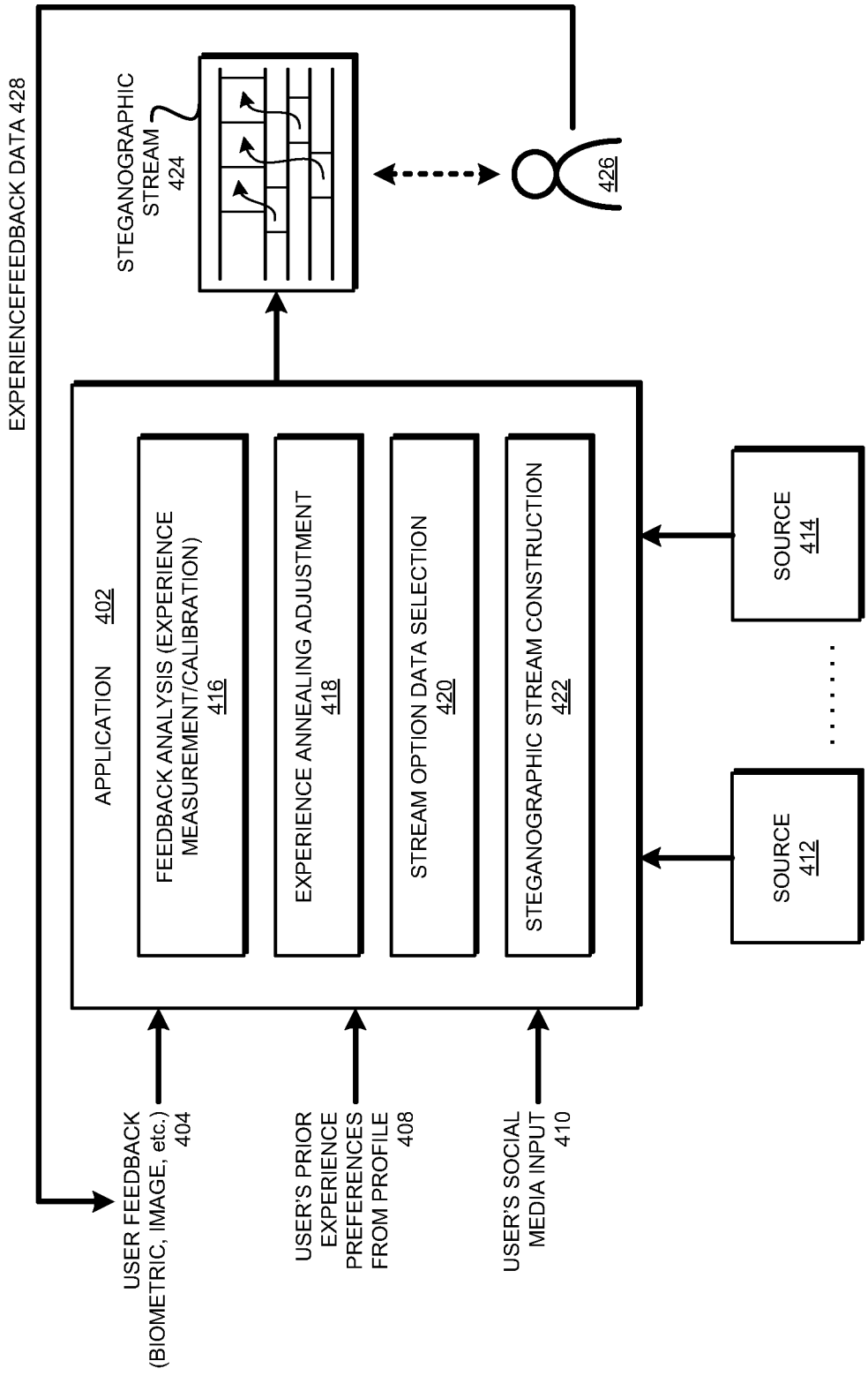
FIG. 4 depicts a block diagram of an example configuration for experience-directed dynamic steganographic content switching in accordance with an illustrative embodiment.

With reference to FIG. 4, this figure depicts a block diagram of an example configuration for experience-directed dynamic steganographic content switching in accordance with an illustrative embodiment. Application 402 is an example of application 302 in FIG. 3.

User feedback 404 includes experience feedback data collected from user 426 to whom a combined stream is being presented in a manner described herein. User 426's experience preferences 408 may be available from a profile, user 426's experience preferences 410 may be available from social media data related to user 426, in a manner described herein.

Sources 412-414 may be any number of data sources similar to sources 304-310 in FIG. 3. Sources 412-414 provide the content and the options data for streaming to user 426.

Component 416 analyzes the feedback data input 404 to perform experience measurement or calibration as described herein. Component 416 uses an experience preference of user 426, e.g., from input 408, 410, or both, to determine a target experience desired for user 426. Component 418 computes an experience adjustment value or values using the measured experience from component 416 and the target experience.

Component 420 selects one or more options for combining with the content being streamed, as described herein. Component 422 combines the selected options with the content at suitable insertion points and portions, e.g., as shown in FIG. 3. The operation of component 422 results in steganographically combined stream 424, e.g., in the form of example combined stream 312 in FIG. 3.

User 426's experience feedback is monitored continually, periodically, or from time to time, to determine whether the experience is trending towards the target experience in a desirable manner, e.g., at a desirable rate. Depending on what experience feedback data 428 indicates as the presentation of combined stream 424 progresses, options can be added, removed, or changed on-the-fly as needed in combined stream 424, to cause the experience trend to desirably progress towards, and achieve, the target experience for user 426.

Figure 5:
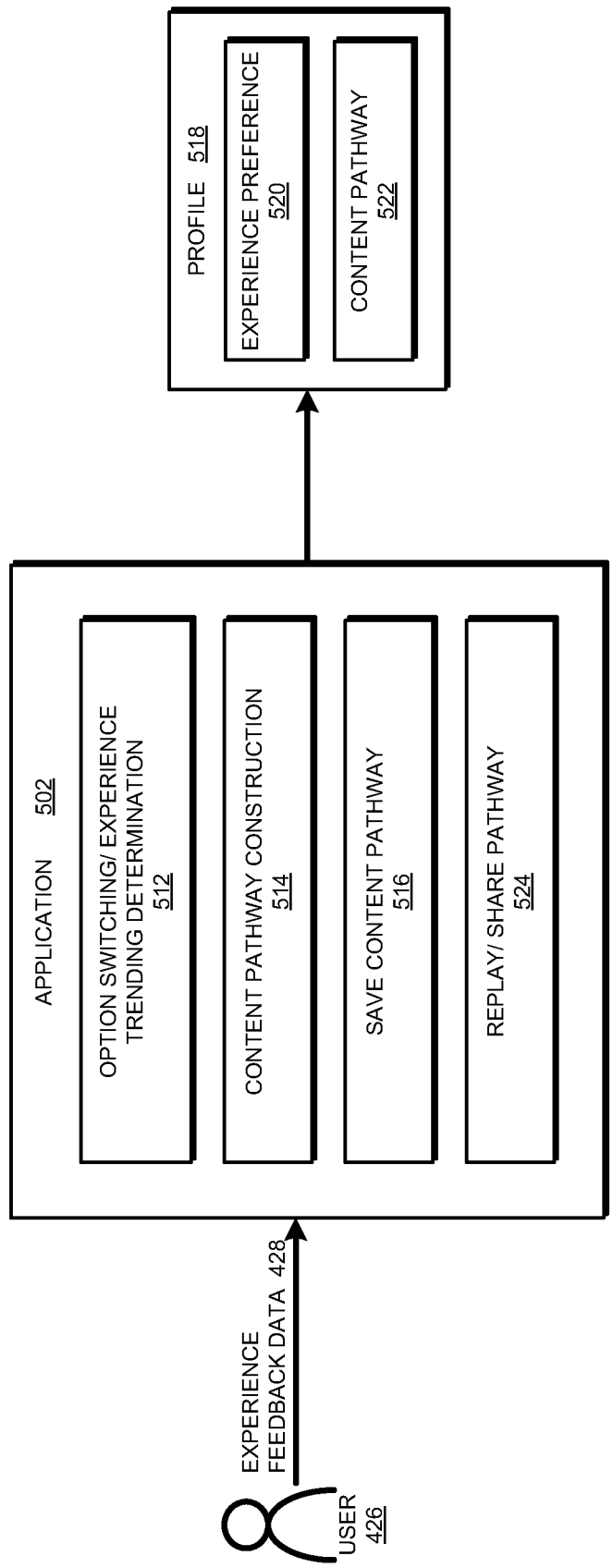
FIG. 5 depicts a block diagram of another example configuration for experience-directed dynamic steganographic content switching in accordance with an illustrative embodiment.

With reference to FIG. 5, this figure depicts a block diagram of another example configuration for experience-directed dynamic steganographic content switching in accordance with an illustrative embodiment. Application 502 extends the functionality of application 402 in FIG. 4.

Applications 502 and 402 can be implemented together or separately within the scope of the illustrative embodiments.

User 426 provides experience feedback data 428 as in FIG. 4. When experience feedback data 428 shows a desired trend towards the target experience, component 512 uses the information about the construction of combined stream 424 of FIG. 4, to determine which options have been used, where they have been inserted, the period or portion for which they have been inserted, and the sequence in which they have been inserted in combined stream 424.

Using this information determined by component 512, component 514 constructs a content pathway in a manner described herein. Component 514 correlates the content pathway with the experience preference that caused the construction of combined stream 424 in this manner. Component 516 saves the experience preference relative to user 426's profile, e.g., in profile 518 as data 520. Component 516 saves the constructed component pathway relative to user 426's profile, e.g., in profile 518 as data 522.

If user 426 desires to re-experience the content in the manner presented during the operation of the configuration of FIG. 4, component 524 reconstructs combined stream 424 using saved content pathway 522, and replays the stream to the user. If user 426 allows sharing of his customized content experience, component 524 shares content pathway 522 with another user in a manner described herein.

Figure 6:
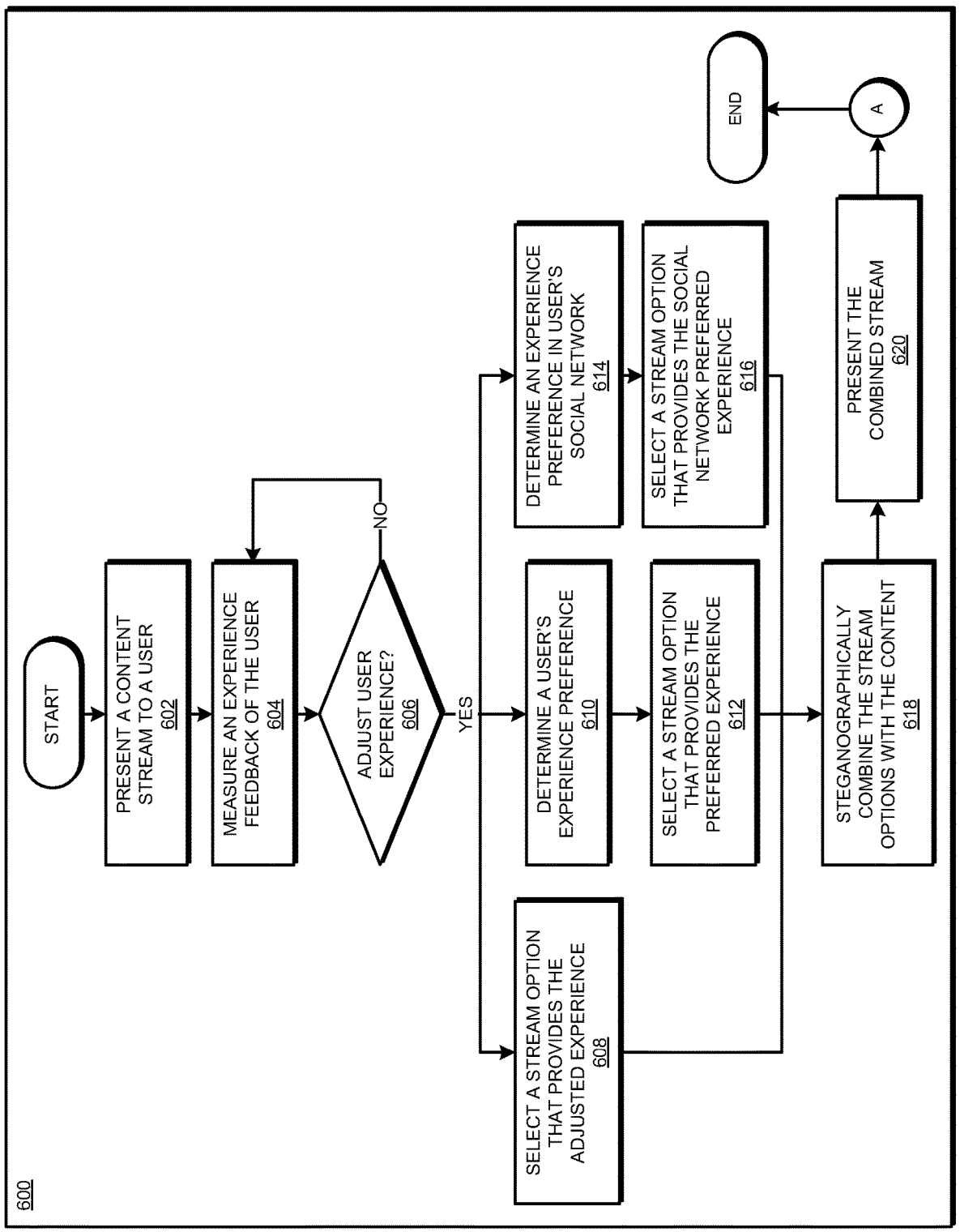
FIG. 6 depicts a flowchart of an example process for experience-directed dynamic steganographic content switching in accordance with an illustrative embodiment.

With reference to FIG. 6, this figure depicts a flowchart of an example process for experience-directed dynamic steganographic content switching in accordance with an illustrative embodiment. Process 600 can be implemented in application 402 of FIG. 4.

The application presents a content stream to a user (block 602). The application measures an experience feedback of the user (block 604).

The application determines whether the experience of the user has to be adjusted (block 606). If the experience is not to be adjusted ("No" path of block 606), the application returns to block 604 and continues monitoring the user's experience with the content.

If the experience is to be adjusted ("Yes" path of block 606), the application may follow one or more of the following possible paths—(i) the application may directly select an option if the option's metadata indicates that the option provides all or a part of the amount and type of adjustment that is required (block 608). (ii) The application may determine a user's experience preference, e.g., from a profile (block 610). The application may then select an option that provides all or a part of the amount and type of adjustment that is required according to the user's preferred experience (block 612). (iii) The application may determine a user's experience preference, e.g., from the user's social network (block 614). The application may then select an option that provides all or a part of the amount and type of adjustment that is required according to the social network's preferred experience (block 616).

The application steganographically combines the selected options with the content (block 618). The application presents the combined stream to the user (block 620). The application either ends process 600 thereafter or exits via exit point "A" to enter process 700 of FIG. 7 at the corresponding entry point "A" therein.

Figure 7:
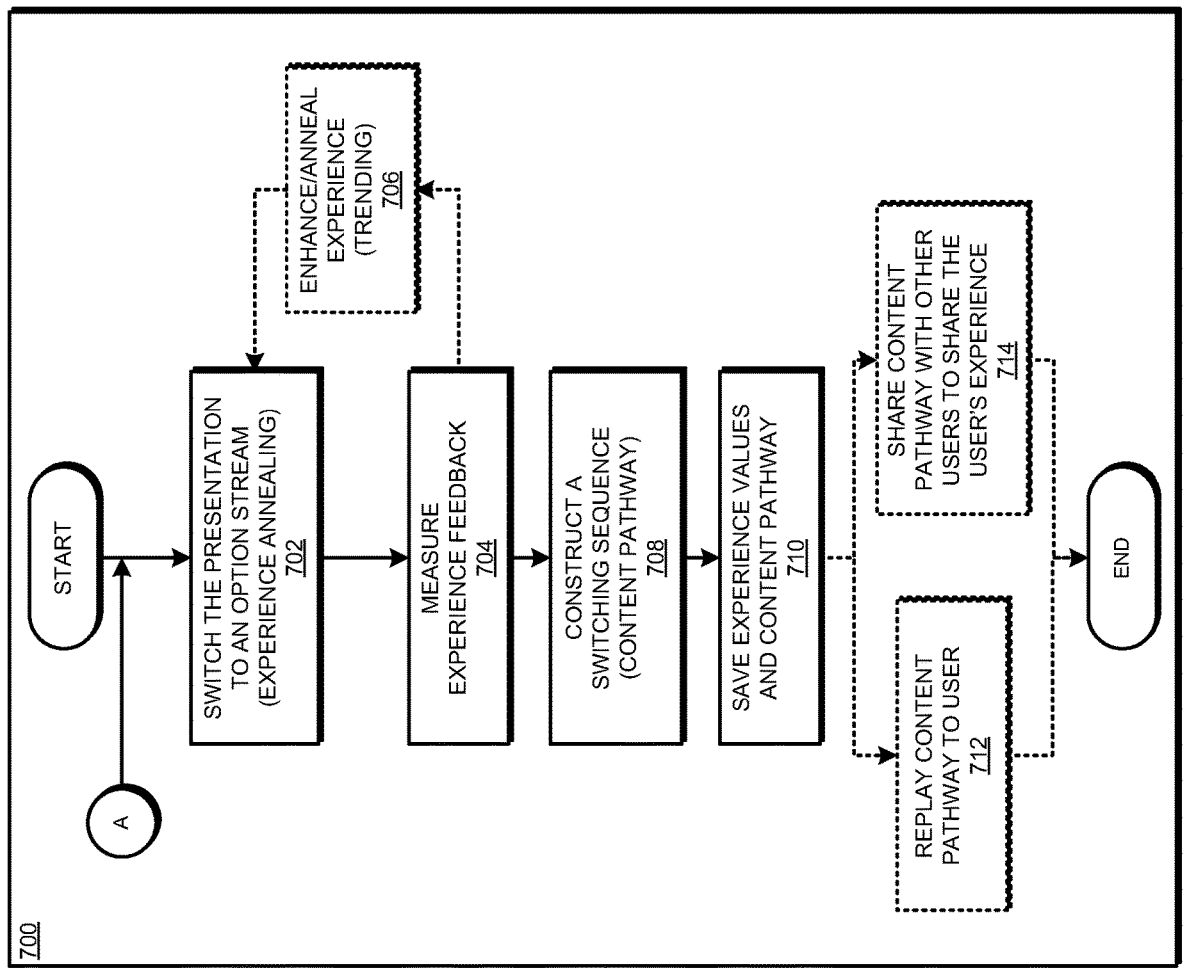
FIG. 7 depicts a flowchart of another example process for experience-directed dynamic steganographic content switching in accordance with an illustrative embodiment.

With reference to FIG. 7, this figure depicts a flowchart of another example process for experience-directed dynamic steganographic content switching in accordance with an illustrative embodiment. Process 700 can be implemented in application 502 of FIG. 5.

The application enters process 700, e.g., from process 600 via entry point "A", and switches the presentation of a combined stream to an option steganographically included in the combined stream (block 702). The application measures the experience feedback of the user in response to the presentation of the option (block 704). The application repeats this process, e.g., by switching to a different included option, dynamically replacing an option with another option in the combined stream, or some combination thereof, to enhance or anneal the experience towards a desired experience, enhance the progression of the user's experience towards the desired experience, or both (block 706). The repetition of blocks 702-706 continues until a desired experience, a desired rate of change of the experience, or both, are achieved by the combined stream.

The application constructs a content pathway from the combined stream that achieves the desired experience, the desired rate of change of the experience, or both (block 708). The application saves the experience values and the content pathway, e.g., as depicted in profile 518 in FIG. 5 (block 710).

The application uses the saved content pathway to recreate and replay the combined stream to recreate the custom experience for the user (block 712). Alternatively or additionally, the application shares the saved content pathway to share the user's custom experience with another user (block 714). The application ends process 700 thereafter.

Thus, a computer implemented method, system or apparatus, and computer program product are provided in the illustrative embodiments for experience-directed dynamic steganographic content switching and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   measuring an experience feedback of a user, the experience feedback being responsive to a presentation of a stream of a content;
   determining that an experience value corresponding to the experience feedback has to be adjusted to a target experience value, wherein the experience value comprises a first type of the experience feedback, and wherein the target experience value comprises a second type of the experience feedback;
   selecting, responsive to the determining, a set of optional content, an optional content in the set of optional content comprising data indicative of an option experience value, the option experience value being at least a component of a difference between the experience value and the target experience value, such that the set of optional content causes shifting, at a predetermined rate of change of the experience feedback, in a direction from the first type of the experience value to the second type of the target experience value; and switching, during the presentation of the stream, to the optional content such that a portion of the content is replaced by the optional content in the presentation, the switching causing in the user a change from the experience value towards the target experience value.

2. The method of claim 1, further comprising:
saving, as a content pathway, information descriptive of the optional content and the portion.

3. The method of claim 2, wherein the content pathway further includes a sequence of the optional content relative to a second optional content that replaces a second portion of the content in the presentation.

4. The method of claim 2, further comprising:
constructing, at a second presentation of the content, a second combined stream using the content pathway; and
playing the second combined stream to cause in the user the change from the experience value towards the target experience value during the second presentation.

5. The method of claim 2, further comprising:
constructing, at a second presentation of the content to a second user, a second combined stream using the content pathway; and
playing the second combined stream to cause the second user to achieve the target experience value during the second presentation.

6. The method of claim 1, wherein the option experience value is sufficient to cover the difference between the experience value and the target experience value.

7. The method of claim 1, further comprising:
selecting, responsive to the determining, a second optional content, the second optional content comprising second data indicative of a second option experience value, the second option experience value being at least a second component of the difference between the experience value and the target experience value, wherein the optional content and the second optional content are usable in combination to cover the difference between the experience value and the target experience value.

8. The method of claim 1, wherein the experience value and the target experience value are each for a common experience type.

9. The method of claim 1, further comprising:
computing, using a past experience of the user with a past presentation of a second content stream, an experience preference of the user;
storing the experience preference in a profile associated with the user; and
computing the target experience value using the experience preference specified in the profile of the user.

10. The method of claim 1, further comprising:
obtaining social media data associated with a social network of the user, the social media data including data of a discussion of an experience with a second content;
computing, using the experience with the second content, an experience preference of the user; and
computing the target experience value using the experience preference of the user.

11. The method of claim 10, wherein another user in the social network has the experience with the second content.

12. The method of claim 1, further comprising:
computing, as a part of the measuring, a value of an indicator, the experience feedback comprising the indicator, the indicator being collected from the user using a biometric sensor, the value of the indicator being a part of the experience value.

13. The method of claim 12, wherein the indicator is a biometric indicator, the biometric indicator is indicative of a sentiment being experienced by the user during the presentation.

14. The method of claim 12, wherein the indicator is a facial expression determined from analyzing an image of the user, the image being captured while the user is experiencing a sentiment during the presentation.

15. A computer usable program product comprising one or more computer-readable storage devices, and program instructions stored on at least one of the one or more storage devices, the stored program instructions comprising:
program instructions to measure an experience feedback of a user, the experience feedback being responsive to a presentation of a stream of a content;
program instructions to determine that an experience value corresponding to the experience feedback has to be adjusted to a target experience value, wherein the experience value comprises a first type of the experience feedback, and wherein the target experience value comprises a second type of the experience feedback;
program instructions to select, responsive to the determining, a set of optional content, an optional content in the set of optional content comprising data indicative of an option experience value, the option experience value being at least a component of a difference between the experience value and the target experience value, such that the set of optional content causes shifting, at a predetermined rate of change of the experience feedback, in a direction from the first type of the experience value to the second type of the target experience value; and
program instructions to switch, during the presentation of the stream, to the optional content such that a portion of the content is replaced by the optional content in the presentation, the switching causing in the user a change from the experience value towards the target experience value.

16. The computer usable program product of claim 15, wherein the computer usable code is stored in a computer readable storage device in a data processing system, and wherein the computer usable code is transferred over a network from a remote data processing system.

17. The computer usable program product of claim 15, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to measure an experience feedback of a user, the experience feedback being responsive to a presentation of a stream of a content;
program instructions to determine that an experience value corresponding to the experience feedback has to be adjusted to a target experience value, wherein the experience value comprises a first type of the experience feedback, and wherein the target experience value comprises a second type of the experience feedback;

program instructions to select, responsive to the determining, a set of optional content, an optional content in the set of optional content comprising data indicative of an option experience value, the option experience value being at least a component of a difference between the experience value and the target experience value, such that the set of optional content causes shifting, at a predetermined rate of change of the experience feedback, in a direction from the first type of the experience value to the second type of the target experience value; and program instructions to switch, during the presentation of the stream, to the optional content such that a portion of the content is replaced by the optional content in the presentation, the switching causing in the user a change from the experience value towards the target experience value.

19. The computer system of claim 18, further comprising:

program instructions to save, as a content pathway, information descriptive of the optional content and the portion.

20. The computer system of claim 19, wherein the content pathway further includes a sequence of the optional content relative to a second optional content that replaces a second portion of the content in the presentation.

* * * * *